United States Patent
Heo et al.

(10) Patent No.: US 10,292,203 B2
(45) Date of Patent: May 14, 2019

(54) SENSOR NETWORK SYSTEM AND METHOD FOR PROCESSING SENSOR DATA

(71) Applicant: ELECTRONICS AND TELECOMMUNICATIONS RESEARCH INSTITUTE, Daejeon (KR)

(72) Inventors: Tae Wook Heo, Sejong (KR); Hyun Hak Kim, Daejeon (KR); Jeong Gil Ko, Daejeon (KR); Yoon Mee Doh, Daejeon (KR); Jong Jun Park, Daejeon (KR); Jong Arm Jun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 803 days.

(21) Appl. No.: 14/602,570

(22) Filed: Jan. 22, 2015

(65) Prior Publication Data

US 2015/0208464 A1    Jul. 23, 2015

(30) Foreign Application Priority Data

Jan. 23, 2014  (KR) .................. 10-2014-0008585

(51) Int. Cl.
*H04W 84/18* (2009.01)
*H04W 4/70* (2018.01)

(52) U.S. Cl.
CPC ............. *H04W 84/18* (2013.01); *H04W 4/70* (2018.02)

(58) Field of Classification Search
CPC ..................................................... H04W 84/18
See application file for complete search history.

(56) References Cited

U.S. PATENT DOCUMENTS

| | | | | |
|---|---|---|---|---|
| 2014/0222997 A1* | 8/2014 | Mermoud | ............. | H04L 41/142 709/224 |
| 2015/0195185 A1* | 7/2015 | Dasgupta | ............ | H04L 41/5025 370/252 |
| 2015/0208464 A1* | 7/2015 | Heo | ...................... | H04W 84/18 702/189 |

FOREIGN PATENT DOCUMENTS

| | | |
|---|---|---|
| KR | 10-2010-0079655 A | 7/2010 |
| KR | 10-2011-0070049 A | 6/2011 |
| KR | 10-2012-0052260 A | 5/2012 |

* cited by examiner

*Primary Examiner* — Seahvosh Nikmanesh
(74) *Attorney, Agent, or Firm* — Rabin & Berdo, P.C.

(57) ABSTRACT

According to a sensor network system and a method for processing sensor data, a sink node collects sensor data from sensor nodes, performs a prediction algorithm which is the same as a prediction algorithm performed in the sensor node to obtain a prediction value, when a sensing value is received from the sensor node, updates the prediction value to the sensing value, stores the sensing value as sensor data, determines whether the sensor node is a representative node when the sensing value is not received from the sensor node, and stores the prediction value as sensor data if the sensor node is the representative node, and corrects the prediction value based on the sensing value of a representative node and stores the corrected prediction value as sensor data if the sensor node is not the representative node.

19 Claims, 6 Drawing Sheets

SENSOR NETWORK SYSTEM AND METHOD FOR PROCESSING SENSOR DATA

CROSS-REFERENCE TO RELATED APPLICATIONS

This application claims priority to and the benefit of Korean Patent Application No. 10-2014-0008585 filed in the Korean Intellectual Property Office on Jan. 23, 2014, the entire contents of which are incorporated herein by reference.

TECHNICAL FIELD

Various embodiments of the present invention relate to a sensor network system and a method for processing sensor data.

BACKGROUND ART

A sensor network system wirelessly collects sensor data from various sensors. In the sensor network system, sensor nodes periodically send sensor data to a sink node.

However, as the number of sensor nodes is increased, an amount of data transmission is geometrically increased. As the amount of data transmission is increased, energy consumption is increased. Further, delay of communication traffic occurs, thereby, reliability of data may be damaged. Therefore, it is required to significantly reduce the amount of data transmission without greatly lowering the reliability of the data.

SUMMARY OF THE INVENTION

The present invention has been made in an effort to provide a sensor network system and a method for processing sensor data. The present invention has been made in an effort to further provide a computer readable recording medium in which a program which executes the method in a computer is recorded. Technical objects to be achieved by various exemplary embodiments of the present invention are not limited to the aforementioned technical objects, and other technical objects may be present.

An exemplary embodiment of the present invention provides a sensor network system including: a sink node which performs a prediction algorithm which is the same as a prediction algorithm which is performed in a sensor node to obtain a prediction value, updates the prediction value to the sensing value and collects the sensing value as sensor data when a sensing value is received from the sensor node, otherwise, determines whether the sensor node is a representative node and collects the prediction value as sensor data if the sensor node is the representative node and corrects the prediction value based on the sensing value of a representative node of a cluster in which the sensor node is included and collects the corrected prediction value as sensor data if the sensor node is not the representative node; a representative node which obtains a sensing value of a representative node through sensing, performs the prediction algorithm to obtain a prediction value of the representative node, compares at least one of the sensing value of the representative node and the prediction value of the representative node in accordance with the prediction algorithm, transmits the sensing value of the representative node to the sink node in accordance with the comparison result, and when the sensing value of the representative node is transmitted to the sink node, transmits the sensing value of the representative node to sensor nodes in the cluster in which the representative node is included; and a sensor node which obtains a sensing value of a sensor node through sensing, performs the prediction algorithm to obtain a prediction value of the sensor node, and when the sensing value of the representative node is received, corrects the prediction value of the sensor node based on the sensing value of the representative node, compares at least one of the sensing value of the sensor node and the corrected prediction value of the sensor node in accordance with the prediction algorithm, transmits the sensing value of the sensor node to the sink node in accordance with the comparison result.

Another exemplary embodiment of the present invention provides a method for processing sensor data, including: performing, by a sink node which collects sensor data from sensor nodes, a prediction algorithm which is the same as a prediction algorithm which is performed in a sensor node to obtain a prediction value; updating, by the sink node, the prediction value to a sensing value when the sensing value is received from the sensor node; storing, by the sink node, the sensing value as sensor data; determining, by the sink node, whether the sensor node is a representative node when the sensing value is not received from the sensor node; storing, by the sink node, the prediction value as sensor data if the sensor node is a representative node; correcting, by the sink node, the prediction value based on a sensing value of the representative node of the cluster in which the sensor node is included if the sensor node is not a representative node; and storing, by the sink node, the corrected prediction value as sensor data.

Yet another exemplary embodiment of the present invention provides a method for processing sensor data, including: performing, by a sensor node which transmits sensor data to a sink node, a prediction algorithm which is the same as a prediction algorithm which is performed in the sink node to obtain a prediction value; obtaining, by the sensor node, a sensing value of the sensor node by sensing; correcting the prediction value based on a sensing value of the representative node, when the sensing value of the representative node is received from a representative node in the cluster in which the sensor node is included; comparing, by the sensor node, at least one of the sensing value of the sensor node and a corrected prediction value in accordance with the prediction algorithm; and transmitting, by the sensor node, the sensing value of the sensor node to the sink node in accordance with a comparison result.

Still another exemplary embodiment of the present invention may provide a computer readable recording medium in which a program for executing a method for processing sensor data is recorded.

The above-described contents broadly and briefly describe features and technical advantages of various exemplary embodiments for more understanding of those skilled in the art from the specific description of the various exemplary embodiments of the disclosure which will be described below. Additional features and advantages of various exemplary embodiments which form the subject of the claims of the disclosure other than the above features and advantages will be further understood from the following specific description.

DETAILED DESCRIPTION

Hereinafter, various embodiments of the present invention will be described in detail with reference to the drawings. In this case, like reference numerals refer to like elements in the respective drawings. Further, detailed descriptions for the previously known features and/or configurations are omitted. In the description below, parts required to understand operations in accordance with various embodiments will be described in priority, the descriptions for elements, which may obscure the gist of the descriptions, are omitted.

Also, in description for the embodiment of the present invention, terms such as first, second, A, B, (a), (b), etc. may be used. These terms are only used to distinguish its components with other components, but the nature, order, or sequence and the like of the component is not limited by the terms.

Figure 1:
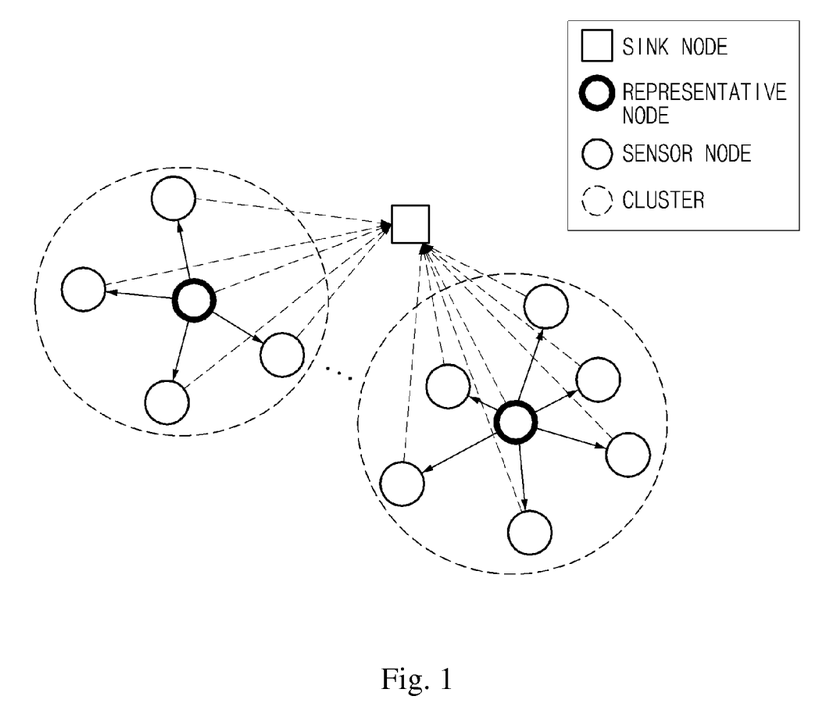
FIG. 1 is a block diagram illustrating a sensor network system according to an exemplary embodiment of the present invention.

FIG. 1 is a block diagram illustrating a sensor network system according to an exemplary embodiment of the present invention. Referring to FIG. 1, a sensor network system may include a sink node 100, a representative node 200, and a sensor node 300.

A sensor network system is a network which is configured to wirelessly collect sensor data from various sensors. The sensor network system according to the exemplary embodiment does not transmit a sensing value when a change between sensing values is not large and transmits the sensing value only when the change is large. When the sensor network system does not transmit the sensing value, the sensor node 300 and the sink node 100 may synchronize the sensor data using the same prediction algorithm. For example, the sensor network system may use a dual prediction scheme (DPS) in the sink node 100 and the sensor node 300, respectively.

As illustrated in FIG. 1, the sink node 100 collects sensor data from the sensor node 300.

The sink node 100 performs the same prediction algorithm as the sensor node 300 to obtain a prediction value. When the sensing value is received from the sensor node 300, the sink node 100 updates the prediction value to the sensing value. The sink node 100 collects the updated sensing value as sensor data.

When the sensing value is not received from the sensor node 300, the sink node 100 may collect sensor data using the prediction value obtained through the prediction algorithm. If the sensor node 300 is the representative node 200, the sink node 100 may collect the obtained prediction value as sensor data. If the sensor node 300 is not the representative node 200, the sink node 100 may correct the obtained prediction value based on a sensing value of the representative node 200 of a cluster in which the sensor node 300 is included and collect the corrected prediction value as sensor data.

For example, the sink node 100 may obtain the sensor data by using the DPS for the representative node. With respect to the sensor nodes which are not the representative node 200, the sink node 100 may obtain the sensor data by correcting the prediction value of the sensing value of the sensor node 300 based on the sensing value of the representative node 200 and performing the DPS on the corrected prediction value. That is, the sensor network system may use an adaptive dual prediction scheme (ADPS) to collect sensor data.

According to an exemplary embodiment, the sink node 100 may apply a changed amount of the sensing value of the representative node 200 to the prediction value as it is to correct the prediction value.

According to an exemplary embodiment, the sink node 100 may apply an EWMA (exponentially weighted moving average) to the changed amount of the sensing value of the representative node 200 to correct the prediction value.

According to an exemplary embodiment, the prediction algorithm may be at least one of a CM (constant measurement) method, an LMS (least mean square) method, an RLS (recursive least square) method, an AR (autoregression) method, an ARMA (autoregression moving average) method, an ES (exponentially smoothing) method, a dual Kalam filter method, and a Gaussian process method.

As illustrated in FIG. 1, the sink node 100 may cluster the sensor nodes. For the convenience of description, only two clusters are illustrated in FIG. 1 but the present invention is not limited thereto and various clusters may be created in the sensor network system.

According to the exemplary embodiment, the sink node 100 may cluster the sensor nodes based on the sensing values of the sensor node 300. For example, the sink node 100 may analyze a series of sensing values of the sensor nodes 300 obtained for a predetermined time and configure sensor nodes having a similar pattern of the sensing values into one cluster.

According to the exemplary embodiment, the sink node 100 may cluster the sensor nodes based on a position of the sensor node 300. For example, the sink node 100 may configure sensor nodes which are physically disposed to be close to each other in accordance with a relative position of each sensor node 300 into one cluster.

According to the exemplary embodiment, the sink node 100 may cluster the sensor nodes using a K-means clustering method.

The sink node 100 may cluster the sensor nodes using various clustering methods.

The sink node 100 may select one among the sensor nodes in the same cluster as the representative node 200. According to the exemplary embodiment, the sink node 100 may select a sensor node 300 which has a sensing value closest to an average of sensing values among the sensor nodes in the same cluster as the representative node 200.

According to the exemplary embodiment, the sink node 100 may select a sensor node 300 which is disposed at the center among the sensor nodes in the cluster as the representative node 200.

According to the exemplary embodiment, the sink node 100 may select a sensor node 300 which has the fastest reaction velocity among the sensor nodes in the cluster as the representative node 200. According to this, the sink node 100 may calculate a delay of each of the sensor nodes in the cluster through an autocorrelation technique and select a sensor node 300 having the smallest delay as the representative node 200.

Alternatively, the sink node 100 may randomly select the representative node 200. As described above, the method for selecting the representative node 200 is not limited to the above-described methods but the sink node 100 may select the representative node 200 using various methods.

The sink node 100 may collect the sensor data obtained as described above and transmit the collected sensor data to an external device.

The representative node 200 is a sensor node which is selected as a reference of the sensor nodes in the same cluster. The representative node 200 also obtains the sensing value through the sensing like other sensor nodes and transmits the sensing value to the sink node 100 in accordance with a result of performing the prediction algorithm.

The representative node 200 performs the same prediction algorithm as the sink node 100 to obtain a prediction value of the representative node 200.

The representative node 200 compares at least one of the sensing value of the representative node 200 and the prediction value of the representative node 200 in accordance with the prediction algorithm and transmits the sensing value of the representative node 200 to the sink node 100 in accordance with a comparison result.

According to the exemplary embodiment, when the prediction algorithm is the CM (constant measurement) method, the representative node 200 may transmit the sensing value of the representative node 200 to the sink node 100 depending on whether a changed amount of the sensing value of the representative node 200 is equal to or higher than a threshold value.

According to the exemplary embodiment, when the prediction algorithm is the LMS (least mean square) method, the representative node 200 may transmit the sensing value of the representative node 200 to the sink node 100 depending on whether a difference between the sensing value of the representative node 200 and the prediction value of the representative node 200 is equal to or higher than a threshold value.

However, the present invention is not limited thereto, but the prediction algorithm may be at least one of a CM method, an LMS method, an RLS (recursive least square) method, an AR (autoregression) method, an ARMA (autoregression moving average) method, an ES (exponentially smoothing) method, a dual Kalam filter method, and a Gaussian process method. Therefore, the representative node 200 may change a comparison target and a comparison method.

When the sensing value of the representative node 200 is transmitted from the representative node 200 to the sink node 100, the representative node 200 may transmit the sensing value of the representative node 200 to sensor nodes in the cluster in which the representative node 200 is included. For example, the representative node 200 may transmit the sensing value of the representative node 200 to the sensor nodes in the same cluster by multi-casting or broadcasting.

The sensor node 300 transmits the sensor data obtained through the sensing to the sink node 100.

The sensor node 300 performs the same prediction algorithm as the sink node 100 to obtain a prediction value of the sensor node 300.

When the sensor node 300 receives the sensing value of the representative node 200 from the representative node 200, the sensor node 300 may correct the prediction value of the sensor node 300 based on the sensing value of the representative node 200. According to the exemplary embodiment, the sensor node 300 may apply a changed amount of the sensing value of the representative node 200 to the prediction value as it is to correct the prediction value.

According to the exemplary embodiment, the sensor node 300 may apply the EWMA (exponentially weighted moving average) to the changed amount of the sensing value of the representative node 200 to correct the prediction value.

The sensor node 300 may compare at least one of the sensing value of the sensor node 300 and the corrected prediction value of the sensor node 300 in accordance with the prediction algorithm and transmit the sensing value of the sensor node 300 to the sink node 100 in accordance with a comparison result.

According to the exemplary embodiment, when the prediction algorithm is the CM (constant measurement) method, the sensor node 300 may transmit the sensing value of the sensor node 300 to the sink node 100 depending on whether a changed amount of the sensing value of the sensor node 300 is equal to or higher than a threshold value.

According to the exemplary embodiment, when the prediction algorithm is the LMS (least mean square) method, the sensor node 300 may transmit the sensing value of the sensor node 300 to the sink node 100 depending on whether a difference between the sensing value of the sensor node 300 and the corrected prediction value is equal to or higher than the threshold value.

However, the present invention is not limited thereto, but the prediction algorithm may be at least one of a CM method, an LMS method, an RLS (recursive least square) method, an AR (autoregression) method, an ARMA (autoregression moving average) method, an ES (exponentially smoothing) method, a dual Kalam filter method, and a Gaussian process method. Therefore, the sensor node 300 may change a comparison target and a comparison method.

Figure 2:
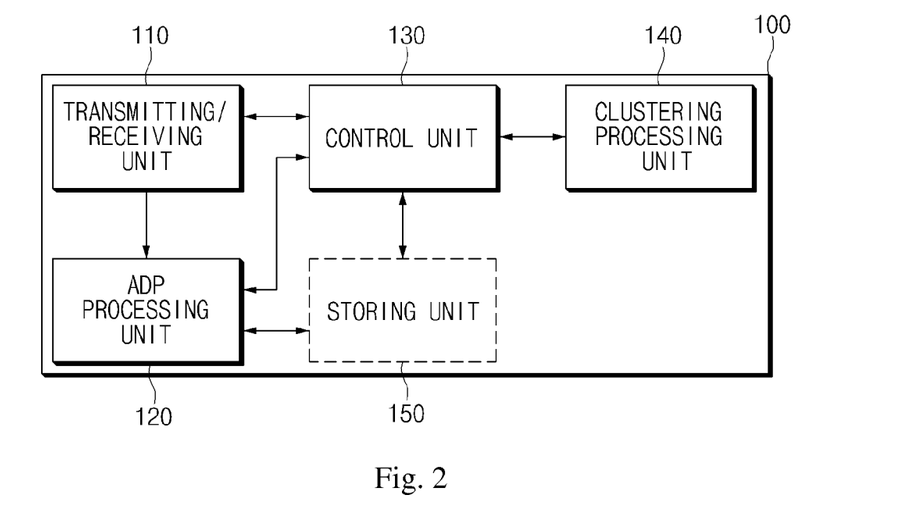
FIG. 2 is a block diagram illustrating a sink node according to an exemplary embodiment of the present invention.

FIG. 2 is a block diagram illustrating a sink node according to an exemplary embodiment of the present invention.

In order to prevent a feature of the exemplary embodiment from being obscure, only components related with the exemplary embodiment will be described in this specification. Therefore, a person of ordinary skill in the art may understand that other general components than the components illustrated in FIG. 2 may be further included.

Referring to FIG. 2, the sink node 100 may include a transmitting/receiving unit 110, an ADP (adaptive dual prediction) processing unit 120, a control unit 130, and a clustering processing unit 140.

The sink node 100 performs a prediction algorithm which is the same as the sensor node 300 and collects the prediction value obtained through the prediction algorithm and the sensing value from the sensor node 300 as the sensor data.

The transmitting/receiving unit 110 receives a sensing value from the representative node 200 or the sensor node 300. The transmitting/receiving unit 110 may transmit the collected sensor data to an external device. The transmitting/receiving unit 110 according to the exemplary embodiment may transmit/receive the sensor data through a wired or wireless network or wired serial communication. In this case, the network may include Internet, a LAN (local area network), a wireless LAN (wireless local area network), a WAN (wide area network), and a PAN (personal area network). Alternatively, the transmitting/receiving unit 110 may transmit/receive sensor data through Bluetooth, RFID (radio frequency identification), IrDA (infrared data association), UWB (ultra wideband), ZigBee, WFD (Wi-Fi Direct), or NFC (near field communication).

The ADP (adaptive dual prediction) processing unit 120 uses the DPS (dual prediction scheme) for the representative node 200 and uses the ADPS (adaptive dual prediction scheme) for the sensor node which is not the representative node 200.

If a sensor node is the representative node 200, the ADP processing unit 120 applies the DPS to the sensing values. Accordingly, when the sensing value is not received from the representative node 200, the ADP processing unit 120 obtains a prediction value by using the prediction algorithm and collects the obtained prediction value as sensor data. When the sensing value is received from the representative node 200, the ADP processing unit 120 updates the prediction value to the received sensing value and collects the received sensing value as sensor data.

It a sensor node is not the representative node 200, the ADP processing unit 120 applies the ADPS to the sensing values. Accordingly, when the sensing value is not received from the sensor node 300, the ADP processing unit 120 corrects the obtained prediction value based on the sensing value of the representative node 200 of the cluster in which the sensor node is included and collects the corrected prediction value as sensor data. When the sensing value is received from the representative node 200, the ADP processing unit 120 updates the corrected prediction value to the received sensing value and collects the received sensing value as sensor data.

The control unit 130 drives the sink node 100 and controls the overall operation of the sink node 100. The control unit 130 according to the exemplary embodiment may be configured by one or more processors.

The clustering processing unit 140 clusters the sensor nodes in the sensor network. The clustering processing unit 140 may cluster the sensor nodes based on the sensing value or the position of the sensor node 300. For example, the clustering processing unit 140 may cluster the sensor nodes using the K-means clustering method. In addition, the sink node 100 may cluster the sensor nodes using any other clustering methods.

The clustering processing unit 140 may select one of the sensor nodes in the same cluster as the representative node 200. For example, the sink node 100 may select a sensor node 300 which has a sensing value closest to an average of sensing values of the sensor nodes among the sensor nodes in the same cluster as the representative node 200. Alternatively, the sink node 100 may select a sensor node 300 which is disposed at the center in the cluster among the sensor nodes as the representative node 200. Alternatively, the sink node 100 may select a sensor node 300 which has the fastest reaction velocity among the sensor nodes in the cluster as the representative node 200. In addition, the sink node 100 may randomly select the representative node 200. The method for selecting the representative node 200 is not limited to the above-described methods but the sink node 100 may select the representative node 200 using various methods.

According to an exemplary embodiment, the sink node 100 may further include a storing unit 150. The storing unit 150 stores the collected sensor data.

The storing unit 150 may include a general storage medium and the storing unit 150 may store data or a program required to control the transmitting/receiving unit 110 in accordance with a processing result of the ADP processing unit 120. Alternatively, the storing unit 150 may store the data or program required for the operation of the sink node 100. The storing unit 150 according to the exemplary embodiment may be implemented by an HDD (hard disk drive), an ROM (read only memory), a RAM (random access memory), a flash memory, a memory card, a NAND memory, or an SDD (solid state drive).

Figure 3:
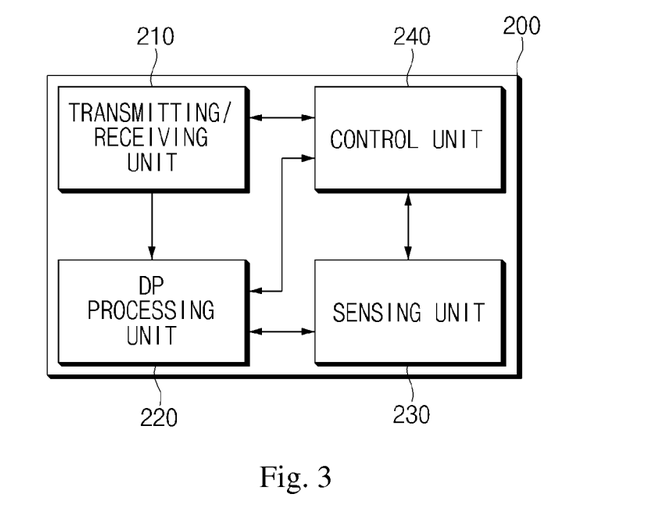
FIG. 3 is a block diagram illustrating a representative node according to an exemplary embodiment of the present invention.

FIG. 3 is a block diagram illustrating a representative node according to an exemplary embodiment of the present invention.

In order to prevent a feature of the exemplary embodiment from being obscure, only components related with the exemplary embodiment will be described in this specification. Therefore, a person of ordinary skill in the art may understand that other general components than the components illustrated in FIG. 3 may be further included.

Referring to FIG. 3, the representative node 200 may include a transmitting/receiving unit 210, a DP (dual prediction) processing unit 220, a sensing unit 230, and a control unit 240.

The representative node 200 performs the prediction algorithm which is the same as the sink node 100 and transmits sensor data to the sink node 100 and the sensor nodes in the same cluster.

The transmitting/receiving unit 210 transmits the sensing value of the representative node 200 to the sink node 100. The transmitting/receiving unit 210 may transmit the sensing value of the representative node 200 to the sensor nodes in the same cluster. For example, the transmitting/receiving unit 210 may transmit the sensing value of the representative node 200 to the sensor nodes in same the cluster by multi-casting or broadcasting.

The transmitting/receiving unit 210 according to the exemplary embodiment may transmit/receive the sensor data through a wired or wireless network or wired serial communication. In this case, the network may include Internet, a LAN (local area network), a wireless LAN (wireless local area network), a WAN (wide area network), and a PAN (personal area network). Alternatively, the transmitting/receiving unit 110 may transmit/receive sensor data through Bluetooth, RFID (radio frequency identification), IrDA (infrared data association), UWB (ultra wideband), ZigBee, WFD (Wi-Fi Direct), or NFC (near field communication).

The DP (dual prediction) processing unit 220 uses the DPS to transmit the sensor data to the sink node 100. The DP processing unit 220 obtains a prediction value through the prediction algorithm and compares at least one of the sensing value and the prediction value of the representative node 200 in accordance with the prediction algorithm. The DP processing unit 220 transmits the sensing value of the representative node 200 to the sink node 100 in accordance with a comparison result.

According to the exemplary embodiment, when the prediction algorithm is the CM (constant measurement) method, the representative node 200 may transmit the sensing value of the representative node 200 to the sink node 100 depending on whether a changed amount of sensing value of the representative node 200 is equal to or higher than a threshold value.

According to the exemplary embodiment, when the prediction algorithm is the LMS (least mean square) method, the representative node 200 may transmit the sensing value of the representative node 200 to the sink node 100 depending on whether a difference between the sensing value of the representative node 200 and the prediction value of the representative node 200 is equal to or higher than a threshold value.

The sensing unit 230 performs sensing to obtain the sensing value of the representative node 200. In this case, the sensing unit 230 may obtain the sensing values from various sensors such as a temperature sensor, a humidity sensor, an illumination sensor, a PIR (passive infrared) motion sensor, and a pressure sensor and process the obtained sensing values.

The control unit 240 drives the representative node 200 and controls the overall operation of the representative node 200. The control unit 240 according to the exemplary embodiment may be configured by one or more processors.

Figure 4:
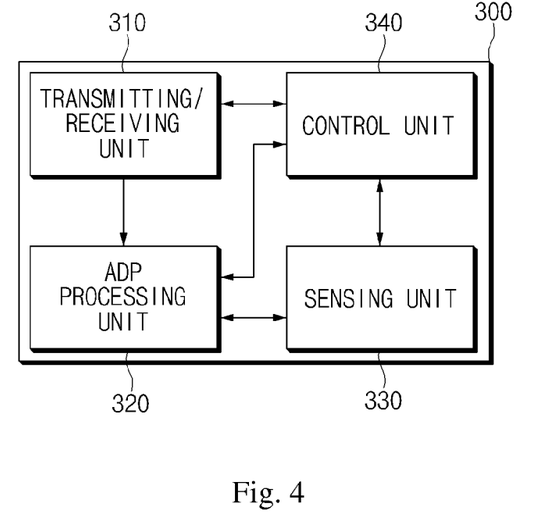
FIG. 4 is a block diagram illustrating a sensor node according to an exemplary embodiment of the present invention.

FIG. 4 is a block diagram illustrating a sensor node according to an exemplary embodiment of the present invention.

In order to prevent a feature of the exemplary embodiment from being obscure, only components related with the exemplary embodiment will be described in this specification. Therefore, a person of ordinary skill in the art may understand that other general components than the components illustrated in FIG. 4 may be further included.

Referring to FIG. 4, the sensor node 300 may include a transmitting/receiving unit 310, an ADP (adaptive dual prediction) processing unit 320, a sensing unit 330, and a control unit 340.

The sensor node 300 performs a prediction algorithm which is the same as the sink node 100. The sensor node 300 may receive the sensing value of the representative node 200 in the same cluster and transmit the sensor data to the sink node 100.

The transmitting/receiving unit 310 transmits the sensing value of the sensor node 300 to the sink node 100. Further, the transmitting/receiving unit 310 may receive the sensing value of the representative node 200 from the representative node 200 of the same cluster.

The ADP (adaptive dual prediction) processing unit 320 uses the ADPS to transmit the sensor data to the sink node 100. The ADP processing unit 320 obtains a prediction value of the sensor node 300 by using the prediction algorithm. When the ADP processing unit 320 receives the sensing value of the representative node 200, the ADP processing unit 320 corrects the obtained prediction value of the sensor node 300 based on the sensing value of the representative node 200.

In this case, the ADP processing unit 320 may correct the prediction value based on the changed amount of received sensing value of the representative node 200. For example, the ADP processing unit 320 may apply the EWMA (exponentially weighted moving average) to the changed amount of the sensing value of the representative node 200 to correct the prediction value.

The ADP processing unit 320 compares at least one of the sensing value of the sensor node 300 and the corrected prediction value of the sensor node 300 in accordance with the prediction algorithm and transmits the sensor data to the sink node 100 in accordance with a comparison result.

The sensing unit 330 performs sensing to obtain the sensing value of the representative node 200. In this case, the sensing unit 330 may obtain the sensing values from various sensors such as a temperature sensor, a humidity sensor, an illumination sensor, a PIR (passive infrared) motion sensor, and a pressure sensor and process the obtained sensing values.

The control unit 340 drives the sensor node 300 and controls the overall operation of the sensor node 300. The control unit 340 according to the exemplary embodiment may be configured by one or more processors.

Figure 5:
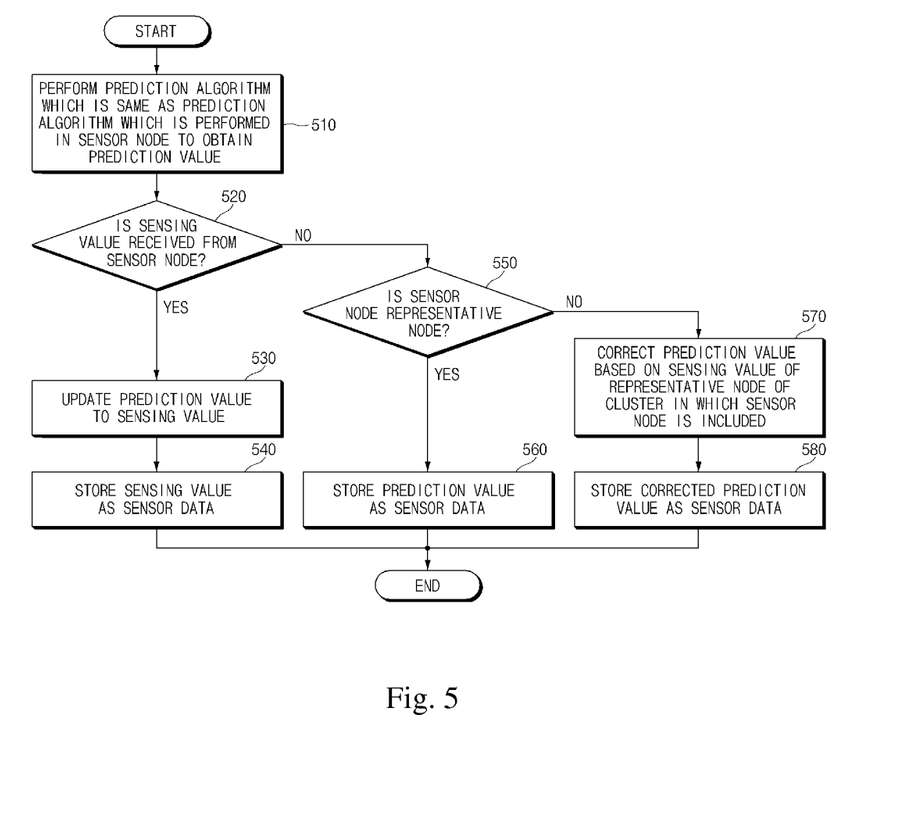
FIG. 5 is a flowchart illustrating a method for processing sensor data in a sink node according to an exemplary embodiment of the present invention.

FIG. 5 is a flowchart illustrating a method for processing sensor data in a sink node according to an exemplary embodiment of the present invention.

The flowchart illustrated in FIG. 5 is configured by processes which are time-sequentially performed in the sensor network system illustrated in FIGS. 1 to 4. Therefore, it is understood that the above description regarding the sensor network system illustrated in FIGS. 1 to 4 may be applied to the flowchart illustrated in FIG. 5 even though it may be omitted below.

A method for processing sensor data according to the exemplary embodiment may be periodically repeated in a sink node 100 in accordance with a time stamp.

In step 510, the sink node 100 may perform a prediction algorithm which is the same as the prediction algorithm which is performed in a sensor node 300 to obtain a prediction value. The prediction algorithm according to the exemplary embodiment may be at least one of a CM method, an LMS method, an RLS (recursive least square) method, an AR (autoregression) method, an ARMA (autoregression moving average) method, an ES (exponentially smoothing) method, a dual Kalam filter method, and a Gaussian process method.

In step 520, the sink node 100 may determine whether to receive a sensing value from the sensor node 300. When the sensing value is received from the sensor node 300, the sequence proceeds to step 530. Otherwise, the sequence proceeds to step 550.

In step 530, the sink node 100 may update a prediction value to a sensing value.

In step 540, the sink node 100 may store the sensing value as sensor data.

In step 550, the sink node 100 may determine whether the sensor node 300 is a representative node 200. When the sensor node 300 is a representative node 200, the sequence proceeds to step 560. Otherwise, the sequence proceeds to step 570.

In step 560, the sink node 100 may store the prediction value as sensor data.

In step 570, the sink node 100 may correct the prediction value based on the sensing value of the representative node 200 of the cluster in which the sensor node 300 is included. According to an exemplary embodiment, the sink node 100 may apply an EWMA (exponentially weighted moving average) to the changed amount of the sensing value of the representative node 200 to correct the prediction value.

In step 580, the sink node 100 may store the corrected prediction value as sensor data. According to an exemplary embodiment, the method may further include a step of clustering, by the sink node 100, the sensor nodes before receiving the sensor data from the sensor nodes. For example, the sink node 100 may cluster the sensor nodes based on the sensing value of the sensor node 300 or a position of the sensor node 300. Alternatively, the sink node 100 may cluster the sensor nodes using a K-means clustering method. In addition, the sink node 100 may cluster the sensor nodes using various clustering methods.

According to an exemplary embodiment, the method may further include a step of determining, by the sink node 100, the representative node 200 among the sensor nodes in the same cluster. For example, the sink node 100 may determine a sensor node 300 which has a sensing value closest to an average of sensing values of the sensor nodes among the sensor nodes in the cluster as the representative node 200. Alternatively, the sink node 100 may determine a sensor node 300 which is disposed at the center of the cluster among the sensor nodes in the cluster as the representative node 200. Alternatively, the sink node 100 may determine a sensor node 300 which has the fastest reaction velocity among the sensor nodes in the cluster as the representative node 200. The method for selecting the representative node 200 by the sink node 100 is not limited to the above-described methods but the sink node 100 may select the representative node 200 using various methods.

After clustering and determining the representative node 200, the sink node 100 may transmit the clustering result and the determining result of the representative node 200 to the sensor nodes in the cluster.

Figure 6:
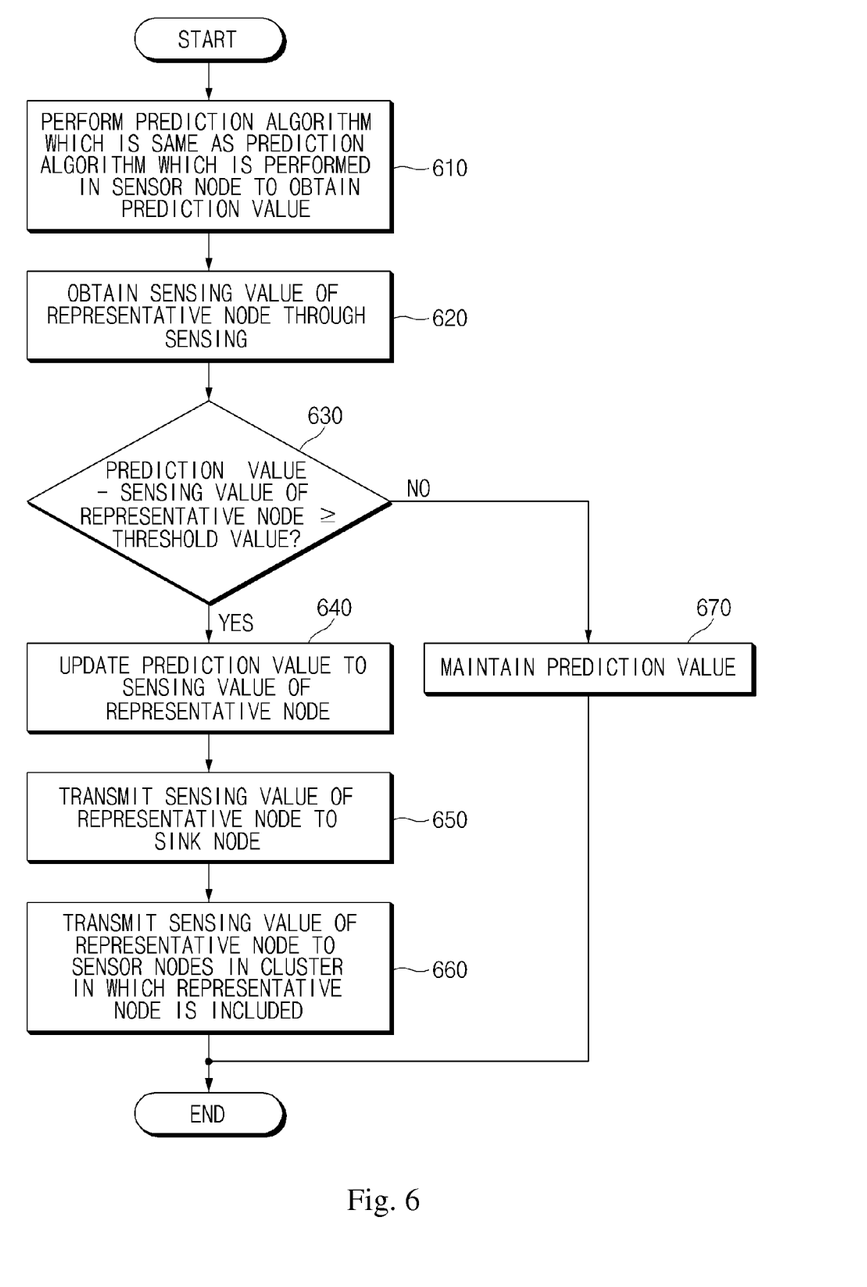
FIG. 6 is a flowchart illustrating a method for processing sensor data in a representative node according to an exemplary embodiment of the present invention.

FIG. 6 is a flowchart illustrating a method for processing sensor data in a representative node according to an exemplary embodiment of the present invention.

The flowchart illustrated in FIG. 6 is configured by processes which are time-sequentially performed in the sensor network system illustrated in FIGS. 1 to 5. Therefore, it is understood that the above description regarding the sensor network system illustrated in FIGS. 1 to 5 may be applied to the flowchart illustrated in FIG. 6 even though it may be omitted below.

A method for processing sensor data according to the exemplary embodiment may be periodically repeated in a representative node 200 in accordance with a time stamp.

In step 610, a representative node 200 may perform a prediction algorithm which is the same as the prediction algorithm which is performed in a sink node 100 to obtain a prediction value. The prediction algorithm according to the exemplary embodiment may be at least one of a CM method, an LMS method, an RLS (recursive least square) method, an AR (autoregression) method, an ARMA (autoregression moving average) method, an ES (exponentially smoothing) method, a dual Kalam filter method, and a Gaussian process method.

In step 620, the representative node 200 may obtain a sensing value of the representative node 200 through sensing.

In step 630, the representative node 200 may determine whether a value obtained by subtracting the sensing value of the representative node 200 from the prediction value is equal to or higher than a prediction value. The representative node 200 according to the exemplary embodiment determines whether to transmit sensor data depending on a difference between the prediction value of the representative node 200 and the sensing value of the representative node 200. However, the present invention is not limited thereto, but the representative node 200 may determine whether to transmit the sensor data depending on a changed amount of the sensing value of the representative node 200. In addition, the representative node 200 may determine whether to transmit the sensor data by various methods in accordance with the prediction algorithm.

When the value obtained by subtracting the sensing value of the representative node 200 from the prediction value is equal to or higher than the threshold value, the sequence proceeds to step 640. Otherwise, the sequence proceeds to step 670.

In step 640, the representative node 200 may update the prediction value to a sensing value of the representative node 200.

In step 650, the representative node 200 may transmit the sensing value of the representative node 200 to the sink node 100.

In step 660, the representative node 200 may transmit the sensing value of the representative node 200 to the sensor nodes in the cluster in which the representative node 200 is included.

In step 670, the representative node 200 may maintain the prediction value.

Figure 7:
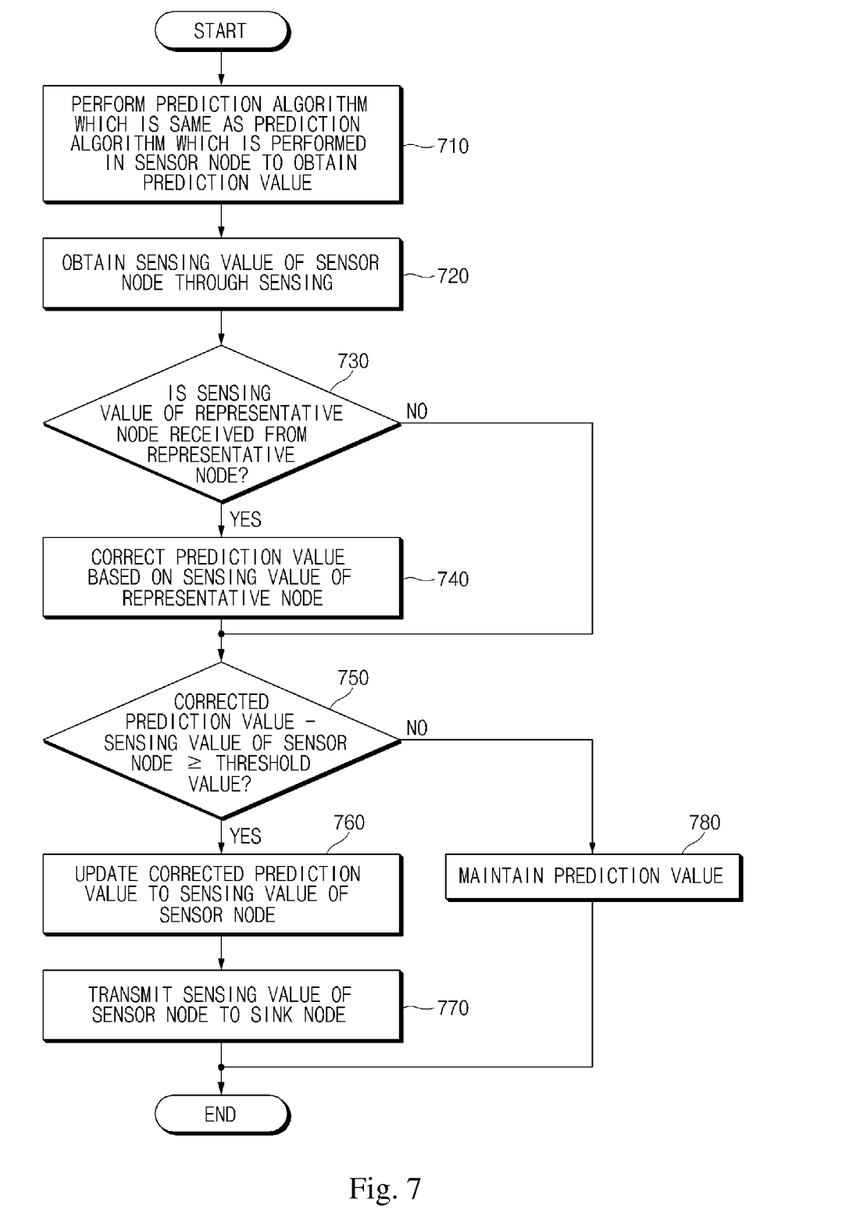
FIG. 7 is a flowchart illustrating a method for processing sensor data in a sensor node according to an exemplary embodiment of the present invention.

FIG. 7 is a flowchart illustrating a method for processing sensor data in a sensor node according to an exemplary embodiment of the present invention.

The flowchart illustrated in FIG. 7 is configured by processes which are time-sequentially performed in the sensor network system illustrated in FIGS. 1 to 6. Therefore, it is understood that the above description regarding the sensor network system illustrated in FIGS. 1 to 6 may be applied to the flowchart illustrated in FIG. 7 even though it may be omitted below.

A method for processing sensor data according to the exemplary embodiment may be periodically repeated in a sensor node 300 in accordance with a time stamp.

In step 710, the sensor node 300 may perform a prediction algorithm which is the same as the prediction algorithm which is performed in a sink node 100 to obtain a prediction value.

In step 720, the sensor node 300 may obtain a sensing value of the sensor node 300 through sensing.

In step 730, the sensor node 300 may determine whether to receive a sensing value of the representative node 200 from the representative node 200.

In step 740, the sensor node 300 may correct a prediction value based on the sensing value of the representative node 200. According to an exemplary embodiment, the sensor node 300 may apply an EWMA (exponentially weighted moving average) to the changed amount of the sensing value of the representative node 200 to correct the prediction value.

In step 750, the sensor node 300 may determine whether a value obtained by subtracting the sensing value of the sensor node 300 from the corrected prediction value is equal to or higher than a prediction value. The sensor node 300 according to the exemplary embodiment determines whether to transmit sensor data depending on a difference between the corrected prediction value and the sensing value of the sensor node 300. However, the present invention is not limited thereto, but the sensor node 300 may determine whether to transmit the sensor data depending on a changed amount of the sensing value of the sensor node 300. In addition, the sensor node 300 may determine whether to transmit the sensor data by various methods in accordance with the prediction algorithm.

When the value obtained by subtracting the sensing value of the sensor node 300 from the corrected prediction value is equal to or higher than a threshold value, the sequence proceeds to step 760. Otherwise, the sequence proceeds to step 780.

In step 760, the sensor node 300 may update the corrected prediction value to the sensing value of the representative node 200.

In step 770, the sensor node 300 may transmit the sensing value of the sensor node 300 to the sink node 100.

In step 780, the sensor node 300 may maintain the prediction value.

A sensor network system according to various exemplary embodiments of the present invention may correct a prediction value of a prediction algorithm based on correlation between sensor nodes when transmitting and receiving sensor data by using the same prediction algorithm in a sink node and a sensor node. Accordingly, the sensor network system may efficiently reduce an amount of transmitted data. Also, the sensor network system may stably transmit data by reducing a communication traffic amount on the whole. Further, an amount of energy consumption in the sensor network may be significantly reduced.

The steps of the method or algorithm explained in connection with the disclosed embodiments may be directly implemented in hardware, a software module, or the combination of both, executed by a processor. The software module may reside in a RAM memory, a flash memory, a ROM memory, an EPROM memory, an EEPROM memory, a register, a hard disk, a removable disk, a CD-ROM, or a storage medium of any other form known in the art. An exemplary storage medium is coupled to a processor, the processor may read information from the storage medium and write information in the storage medium. In the alternative, the storage medium ma by integral to the processor. The processor and the storage medium may be resided in an application specific integrated circuit (ASIC). ASIC may reside in a user terminal. In the alternative, the processor and the storage medium may reside as discrete components in a user.

All embodiments and conditional examples disclosed in this specification are just for describing by way of examples thereof in order to help that ordinary skill in the art understand the principle and concept of the present invention, and it will be understood by those skilled in the art that the present invention may be implemented as various modifications with departing from the spirit of the present invention. Therefore, the disclosed embodiments must be considered not as a view of limitation but as a view of description. The scope of the present invention is recited in the appended claims, not the above descriptions, and all differences within the equivalent scope of the present invention will be construed as being included in the present invention.

What is claimed is:

1. A sensor network system comprising:
   a sink node including a first processor and a non-transitory storage medium; and
   a cluster of sensor nodes, one of which is a representative node, each sensor node including
      a sensor for obtaining a sensing value, and
      a second processor, the second processor being configured to perform dual prediction processing to obtain a predicted sensing value,
         if said each sensor node is the representative node,
            determine whether a difference between the sensing value and the predicted sensing value is larger than a threshold, and
            upon determining that the difference is larger than the threshold, transmit the sensing value to the sink node and to other sensor nodes in the cluster of sensor nodes, and
         if said each sensor node is not the representative node,
            correct the predicted sensing value using the sensing value of the representative node,
            determine whether a difference between the sensing value and the corrected predicted sensing value is larger than the threshold, and
            upon determining that the difference is larger than the threshold, transmit the sensing value to the sink node, wherein
   the sink node is configured to, via the second processor,
      receive each sensing value transmitted by one of the sensor nodes, and store the received sensing value in the non-transitory storage medium as sensor data for said one sensor node, and
      update the sensor data for each of the sensor nodes, by retrieving the sensor data from the non-transitory storage medium, and using the retrieved sensor data to obtain predicted sensor data,
         if a sensing value has been received from said each sensor node after a previous update, updating the sensor data using the received sensing value, and
         if no sensing value has been received from said each sensor node after the previous update,
            updating the sensor data using the predicted sensor data if said each sensor node is the representative node,
            correcting the predicted sensor data using the sensor data of the representative node, and updating the sensor data using the corrected predicted sensor data, if said each sensor node is not the representative node, and
            based on the updating of the sensor data, determining a changed representative node to be one of the sensor nodes of which the sensing value is closest to an average of the sensing values of the sensor nodes in the cluster of sensor nodes.

2. The sensor network system of claim 1, wherein the sensor nodes are clustered based on the sensing values of the sensor nodes or positions of the sensor nodes.

3. The sensor network system of claim 1, wherein the sensor nodes are clustered using a K-means clustering method.

4. The sensor network system of claim 1, wherein the representative node is
   one of the sensor nodes disposed at a center of the cluster of sensor nodes,
   one of the sensor nodes having a fastest reaction velocity among the sensor nodes in the cluster of sensor nodes, and
   one of the sensor nodes that is randomly selected by the sink node among the sensor nodes in the cluster of sensor nodes.

5. The sensor network system of claim 1, wherein the correction by the sink node and the sensor nodes are performed based on a changed amount of the sensing value of the representative node.

6. The sensor network system of claim 5, wherein the correction by the sink node and the sensor nodes are performed by applying an EWMA (exponentially weighted moving average) to the changed amount of the sensing value of the representative node.

7. The sensor network system of claim 1, wherein the representative node transmits the sensing value of the representative node by multi-casting or broadcasting.

8. The sensor network system of claim 1, wherein both the predicted sensing value and the predicted sensor data are obtained through one of a CM (constant measurement) method, an LMS (least mean square) method, an RLS (recursive least square) method, an AR (autoregression) method, an ARMA (autoregression moving average) method, an ES (exponentially smoothing) method, a dual Kalam filter method, and a Gaussian process method.

9. A method for a sink node of a sensor network system to process sensor data, the sensor network system including
   the sink node including a first processor and a non-transitory storage medium; and
   a cluster of sensor nodes, one of which is a representative node, each sensor node including
      a sensor for obtaining a sensing value, and
      a second processor, the second processor being configured to perform dual prediction processing to obtain a predicted sensing value,
         if said each sensor node is the representative node, determine whether a difference between the sensing value and the predicted sensing value is larger than a threshold, and
upon determining that the difference is larger than the threshold, transmit the sensing value to the sink node and to other sensor nodes in the cluster of sensor nodes,
if said each sensor node is not the representative node,
correct the predicted sensing value using the sensing value of the representative node,
determine whether a difference between the sensing value and the corrected predicted sensing value is larger than the threshold, and
upon determining that the difference is larger than the threshold, transmit the sensing value to the sink node,
the method comprising:
receiving each sensing value transmitted by one of the sensor nodes, and storing the received sensing value in the non-transitory storage medium as sensor data for said one sensor node, and
updating the sensor data for each of the sensor nodes, by
retrieving the sensor data from the non-transitory storage medium, and using the retrieved sensor data to obtain predicted sensor data,
if a sensing value has been received from said each sensor node after a previous update, updating the sensor data using the received sensing value, and
if no sensing value has been received from said each sensor node after the previous update,
updating the sensor data using the predicted sensor data if said each sensor node is the representative node,
correcting the predicted sensor data using the sensor data of the representative node, and updating the sensor data using the corrected predicted sensor data, if said each sensor node is not the representative node, and
based on the updating of the sensor data, determining a changed representative node to be one of the sensor nodes of which the sensing value is closest to an average of the sensing values of the sensor nodes in the cluster of sensor nodes.

10. The method of claim 9, further comprising:
clustering, by the sink node, the sensor nodes;
determining, by the sink node, the representative node among the cluster of sensor nodes; and
transmitting, by the sink node, a clustering result and a determining result of the representative node to the sensor nodes.

11. The method of claim 10, wherein the clustering is based on the sensing values of the sensor nodes or positions of the sensor nodes.

12. The method of claim 10, wherein the clustering is performed using a K-means clustering method.

13. The method of claim 10, wherein the determining of the representative node includes determining, by the sink node, one of the sensor nodes which has a sensing value closest to an average of sensing values of the sensor nodes in the cluster of sensor nodes as the representative node.

14. The method of claim 10, wherein the determining of the representative node includes determining, by the sink node, one of the sensor nodes which is disposed at a center of the cluster of sensor nodes as the representative node.

15. The method of claim 10, wherein the determining of the representative node includes determining, by the sink node, one of the sensor nodes which has a fastest reaction velocity among the sensor nodes in the cluster of sensor nodes as the representative node.

16. A method for a sensor network system to process sensor data, the sensor network system including a sink node that has a first processor and a non-transitory storage medium, and a cluster of sensor nodes, one of which is a representative node, that each has a sensor for obtaining a sensing value, and a second processor, the second processor being configured to perform dual prediction processing, the method comprising:
obtaining, by one of the sensor nodes using the sensor thereof, a sensing value;
obtaining, by the first processor of said one sensor node, a predicted sensing value;
if said each sensor node is the representative node,
determining, by the first processor thereof, whether a difference between the sensing value and the predicted sensing value is larger than a threshold, and
upon determining that the difference is larger than the threshold, transmitting the sensing value to the sink node and to the other sensor nodes in the cluster of sensor nodes; and
if said each sensor node is not the representative node,
correcting, by the first processor thereof, the predicted sensing value using a sensing value of the representative node,
determining, by the first processor thereof, whether a difference between the sensing value and the corrected predicted sensing value is larger than the threshold,
upon determining that the difference is larger than the threshold, transmitting the sensing value to the sink node,
updating sensor data based on the transmitted sensing value, and
based on the updating of the sensor data, determining a changed representative node to be one of the sensor nodes of which the sensing value is closest to an average of the sensing values of the sensor nodes in the cluster of sensor nodes.

17. The method of claim 16, wherein the correcting is performed by applying, by said one sensor node, an EWMA (exponentially weighted moving average) to a changed amount of the sensing value of the representative node.

18. The method of claim 16, wherein the representative node transmits the sensing value of the representative node by multi-casting or broadcasting.

19. The sensor network system of claim 1, wherein the sensor nodes include at least one of a temperature sensor, a humidity sensor, an illumination sensor, a PIR (passive infrared) motion sensor, or a pressure sensor.

* * * * *